July 11, 1950  A. A. WEST  2,514,431

VALVE

Filed March 27, 1946  2 Sheets-Sheet 1

INVENTOR.
AUSTIN A. WEST
BY M. Hayes
ATTORNEY

July 11, 1950          A. A. WEST          2,514,431
VALVE
Filed March 27, 1946          2 Sheets-Sheet 2
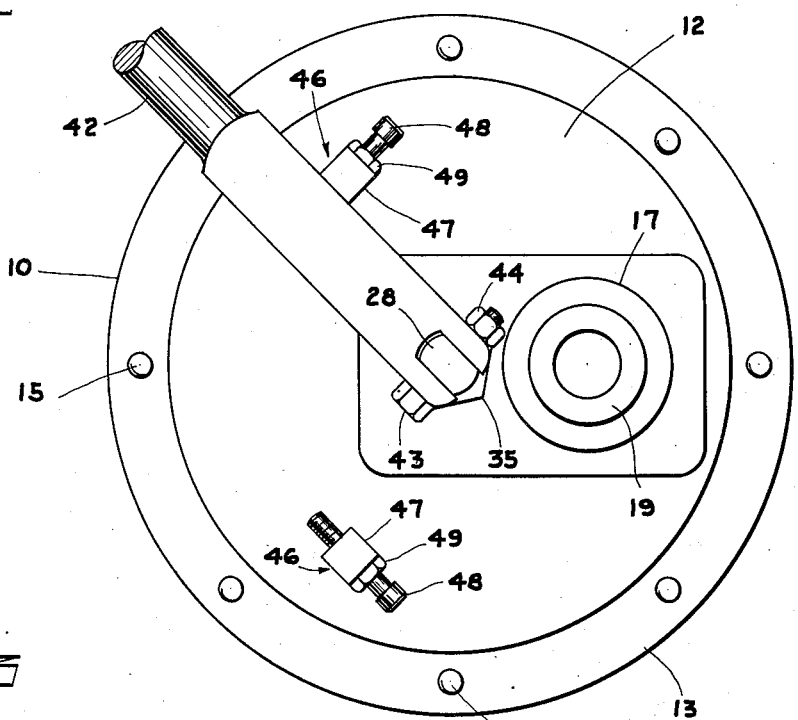
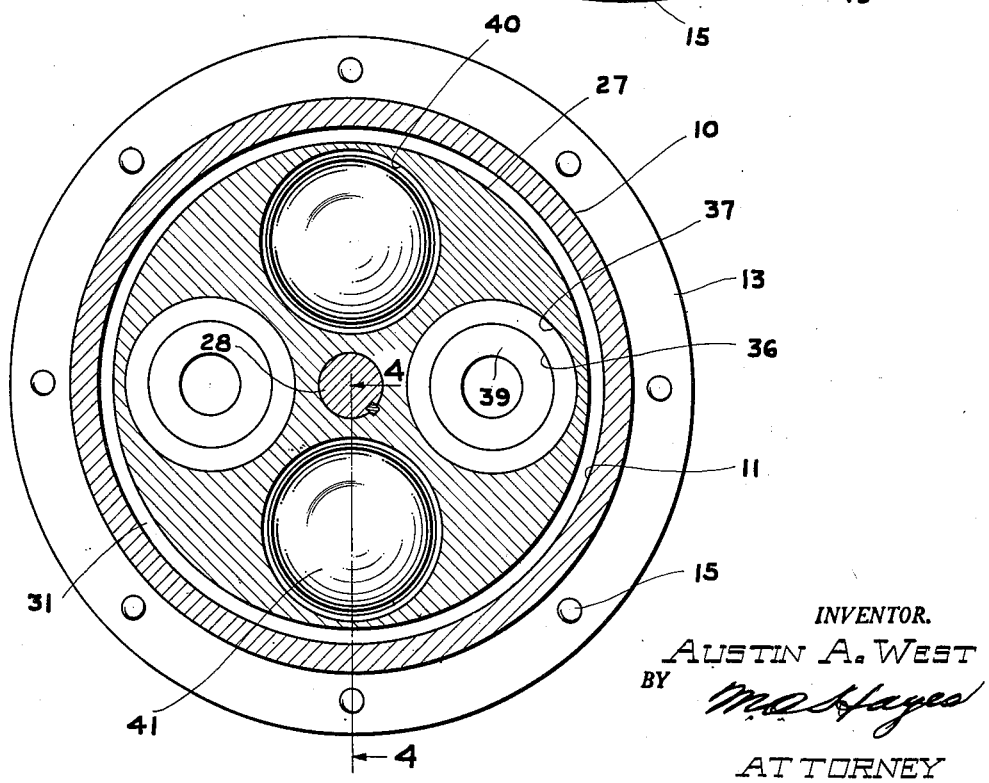
INVENTOR.
AUSTIN A. WEST
BY
*M. A. Hayes*
ATTORNEY Patented July 11, 1950

2,514,431

UNITED STATES PATENT OFFICE 2,514,431

VALVE

Austin A. West, Redondo Beach, Calif.

Application March 27, 1946, Serial No. 657,462

4 Claims. (Cl. 51—12)

(Granted under the act of March 3, 1883, as amended April 30, 1928; 370 O. G. 757)

This invention relates to valves and more particularly to sandblast valves.

An object of the invention is to provide an improved valve of such construction as to be capable of controlling the flow of sand under pressure without excessive wear so as to eliminate the necessity of frequent replacement of parts.

Other objects of the invention are to provide an improved sandblast valve having an unrestricted, unidirectional flow passage and replaceable inserts for reducing wear to a minimum; to provide an improved valve, of the character described, having a valve member which is provided with a pair of flow passages adapted to be employed at will so as to prolong the use of the valve member; to provide an improved valve, of the character described, having an appreciable clearance between its valve member and housing so as to eliminate binding of the member and excessive wear of said member and housing; and to provide improved elements and arrangements thereof in a valve of the character described and for the purposes set forth.

In accomplishing these and other objects of the present invention, I have provided improved details of structure, the preferred form of which is illustrated in the accompanying drawings, wherein:

Fig. 2 is a plan view of the valve.

Fig. 3 is a horizontal, cross-sectional view, taken on the line 3—3 of Fig. 1.

Figure 1:
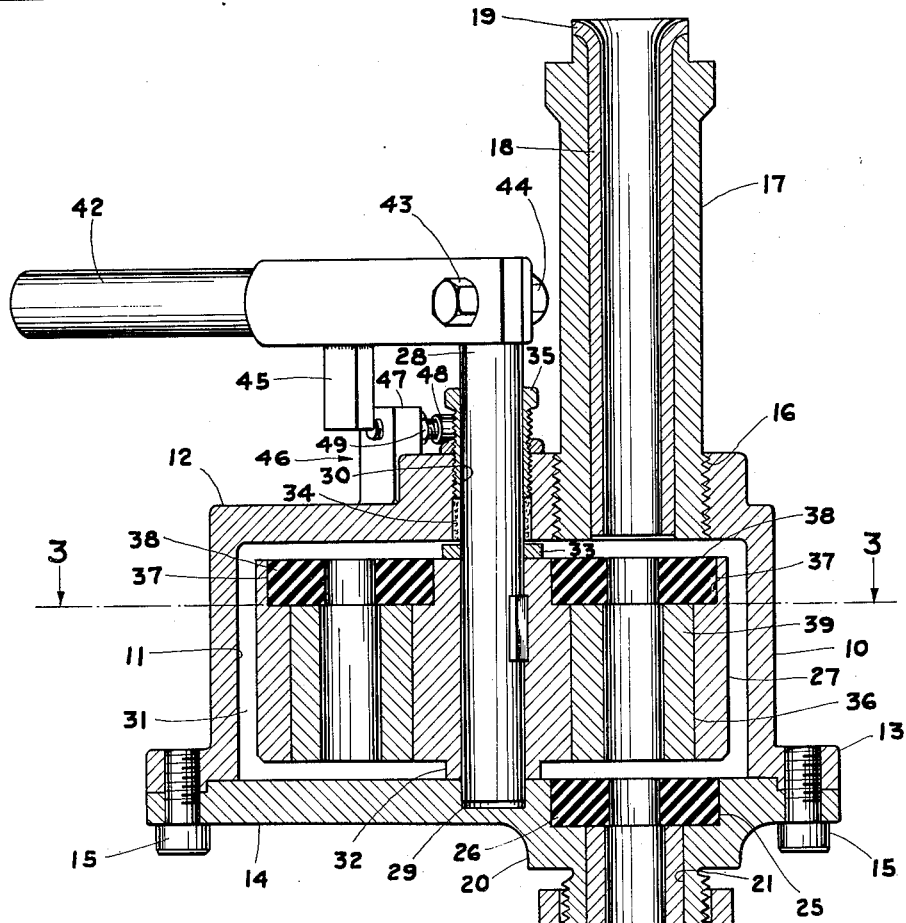
Fig. 1 is a transverse, vertical, sectional view of a valve embodying the features of the present invention.

Referring more in detail to the drawing:

In Fig. 1, the numeral 10 designates an upright, cylindrical, valve casing or housing which is preferably of greater diameter than height and which is of hollow construction so as to provide a chamber 11 therein. The housing 10 has a substantially flat top 12 and its open lower end is formed with an external, radial flange 13 for receiving a flat, circular disc or plate 14. A plurality of cap screws 15 fasten the plate 14 to the flange 13 whereby said plate forms a bottom for the chamber 11.

An inlet opening 16 is formed in the top 12 adjacent its peripheral edge and is screw-threaded for receiving a tubular coupling member 17 which projects upwardly therefrom. The upper end of the coupling member 17 is adapted to have a hose (not shown) connected thereto for conducting sand under pressure from a source (not shown) to the chamber 11. An insert sleeve 18, of hardened metal or other suitable material, engages within the coupling member and is co-extensive therewith so as to shield the bore of said coupling member from the abrasive action of the sand. If desired, the upper end of the sleeve 18 may be flared outwardly as shown by the numeral 19 so as to overlie the upper end of the coupling member.

An annular boss 20 depends from the plate 14 and has its bore 21, which provides an outlet for the chamber, axially aligned with the bore of the upper coupling member 17. For connecting a discharge line (not shown) to the boss 20, a lower coupling member 22 engages within the bore 21 and is confined therein by a radial flange 23 formed on the coupling member and a coacting flanged collar 24 screw-threaded upon said boss. Due to this arrangement the coupling member 22 is readily removable so as to be replaceable when worn to an excessive degree.

In order to shield the bore 21 and the upper end of the lower coupling member, the upper end of said bore is enlarged to provide the counterbore 25 for receiving an annular grommet or seat 26, of rubber or other suitable material. It is preferable that the internal diameter of the grommet 26 be less than the internal diameter of the lower coupling member whereby said grommet overlies said coupling member.

For controlling the passage of sand through the chamber 11 from the inlet to the outlet, a circular valve body or member 27 is rotatably mounted within said chamber by means of an axial stem or shaft 28 which is keyed or otherwise secured to the valve body. The lower end of the shaft 28 is journalled within a recess or sump 29 formed axially in the upper surface of the plate 14 and has its upper end extending through an axial opening 30 in the top 12. The valve body 27 is of less height and diameter than the chamber so as to provide a space 31 between the adjacent surfaces of said valve body and chamber of approximately $\frac{3}{16}$ to $\frac{1}{4}$ of an inch. An annular, axial collar or boss 32 depends from the lower surface of the valve body in surrounding relation to the shaft 28 and an annular spacer 33 is confined upon said shaft between said valve body and the housing top 12, whereby the desired spaced relationship is maintained. Suitable packing 34, preferably of the asbestos type, is disposed within the opening 30 so as to encircle the shaft and is confined therein by a screw-threaded packing gland 35.

The valve body 27 has a pair of circular passages or openings 36 extending vertically therethrough in spaced, diametric relation. The upper end of each opening 36 is of enlarged diameter to provide an annular recess or counterbore 37 which is adapted to receive an annular grommet or ring, of rubber or other suitable material, substantially identical to the grommet 26. Due to the small internal diameter of the grommet 38, the inner peripheral portion of the same overlies the opening 36 as well as an insert sleeve 39 which has a press-fit within said opening so as to be removable therefrom. The internal diameter of the sleeve 39 is substantially equal to the internal diameters of the sleeve 18 and lower coupling collar 22. Each opening 36 of the valve body may be registered with the inlet and outlet by rotative adjustment of said valve body.

Figure 4:
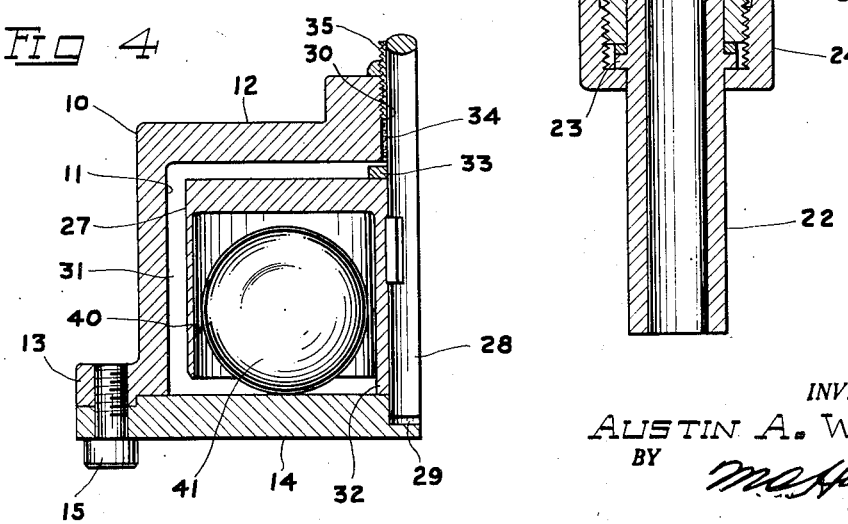
Fig. 4 is a transverse, vertical, sectional view, taken on the line 4—4 of Fig. 3, showing one of the valve elements.

For shutting off flow through the housing, the lower surface of the valve body is provided with a pair of diametrically-opposed chambers or recesses 40 which are disposed preferably midway between the openings of said body (Fig. 3). The dimensions of each recess 40 are sufficient to receive and house a large spherical valve element or ball 41 (Fig. 4), of rubber or other suitable material, the ball resting and riding upon the bottom plate 14 of the chamber 11. By rotative adjustment of the valve body, either of the recesses 40 may be axially aligned with the outlet so that the ball 41, confined within said recess, overlies the grommet 26 and coacts therewith to close said outlet.

In order to rotate the valve body, a handle 42 is secured to the shaft 28 by a suitable bolt 43 and nut 44 and extends radially thereof. The handle has a lug or stop 45 depending therefrom for coacting with stops 46 carried by the top 12 of the housing 10. As is clearly shown in Figs. 1 and 2, each stop 46 includes an upright post 47, having a set screw 48 extending horizontally there-through, which is so positioned as to be disposed in the path of the handle stop 45. A jam nut 49 is carried by each set screw 48 for maintaining the same in adjusted positions relative to its post 47. The stops 46 are disposed at substantially 90° from each other, whereby one of the openings 36 or one of the recesses 40 is in alignment with the outlet when the handle stop is in engagement with one of the housing stops.

Operation

The operation of a valve constructed as described is as follows:

In order to permit uninterrupted, unidirectional flow from the inlet through the chamber 11 of the housing 10 to the outlet, the handle 42 is swung in a clockwise direction whereby its stop 45 is in engagement with the clockwise housing stop 46 (Figs. 1 and 2). In this position of the handle, one of the openings 36 of the valve body 27 registers with and establishes communication between the inlet and outlet. When it is desired to shut off flow through the valve chamber, the handle is turned 90° in a counter-clockwise direction (Fig. 2) so as to move its stop into engagement with the counter-clockwise housing stop, thereby imparting counter-clockwise rotation to the valve body and disposing one of its recesses 40 in alignment with the outlet. The valve ball 41, confined within the aligned recess overlies and closes the bore of the grommet 26 so as to shut off flow from the chamber 11 through the outlet. Due to the clearance or space 31 between the valve body and chamber, sand is permitted to enter said chamber and, being under pressure, maintains the valve ball seated against the grommet 26. Opening of the valve is readily accomplished upon reverse rotation of the valve body by turning the handle in a clockwise direction so as to align one of the openings with the inlet and outlet.

It is pointed out that one of the valve openings 36 and one of the valve balls 41 are non-functional when the other opening and/or ball are in use. Upon excessive wear of the employed opening or ball, the non-functional opening and ball are adapted to be brought into use by disconnecting the handle 42 from the shaft 28, or by swinging the same upwardly, rotating the valve body 27 one-half a turn or approximately 180° and then again connecting said handle with said shaft. Due to the provisions of two flow passages and balls, the use of the valve is substantially doubled without dismantling the same or replacement of any of its parts.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A sandblast valve including, a cylindrical hollow housing having an inlet and an outlet in axial alignment, a cylindrical valve member rotatably mounted in the housing and of less height and diameter than the interior of said housing so as to be spaced therefrom, the valve member having a pair of diametrically-opposed flow passages extending there-through and adapted to register with the inlet and outlet upon rotative adjustment of said member, a sleeve of wear-resisting material removably disposed in each flow passage, said valve member having a pair of chambers therein between its flow passages adapted to communicate with said outlet upon rotative adjustment of said member and being closed on the side adjacent said inlet, a spherical valve element of elastic material confined within each chamber so as to overlie and close said outlet upon rotative adjustment of said valve member, an axial shaft secured to and extending upwardly from said valve member through said housing, a handle fastened to the shaft for rotatably adjusting the position of said valve member, and means carried by said housing for coacting with the handle to limit rotation of said valve member.

2. A sandblast valve including, a housing, an upright cylindrical chamber within the housing, said housing having an inlet and an outlet communicating with the chamber and in axial vertical alignment with each other, a rotatable valve member concentrically mounted in said chamber and of less diameter and height than said chamber so as to be spaced therefrom, an axial stem projecting inwardly from the valve member through said housing for permitting manual rotation of said member, said valve member having a pair of vertical flow passages extending there-through and adapted to register with the inlet and outlet upon rotative adjustment of said member, a chamber in said valve member intermediate the flow passages adapted to communicate with said outlet upon rotative adjustment of said member and being closed on the side adjacent said inlet, and an elastic ball confined within the valve chamber for overlying and closing said outlet upon rotative adjustment of said valve member.

3. A sandblast valve including, a housing, an upright cylindrical chamber within the housing, said housing having an inlet and an outlet communicating with the chamber and in axial vertical alignment with each other, a rotatable valve member concentrically mounted in said chamber and of less diameter and height than said chamber so as to be spaced therefrom, an axial stem projecting upwardly from the valve member through said housing for permitting manual rotation of said member, said valve member having a vertical flow passage therein adapted to register with the inlet and outlet upon rotative adjustment of said member, and a spherical valve element loosely confined by said valve member outside said flow passage for closing said outlet upon rotative adjustment of said member.

4. A sandblast valve including, a housing having an inlet and an outlet, a chamber within the housing communicating with the inlet and outlet, a rotatable valve body within the chamber, the valve body having a flow passage therethrough adapted to be moved into and out of registration with said inlet and outlet by rotation of said body, a valve element carried by said body adjacent said flow passage for closing said outlet upon rotation of said body to a predetermined position, and means for rotating said body.

AUSTIN A. WEST.

REFERENCES CITED

The following references are of record in the file of this patent:

UNITED STATES PATENTS

| Number | Name | Date |
|---|---|---|
| 1,299,452 | Foster | Apr. 8, 1919 |
| 1,549,969 | Grindle | Aug. 18, 1925 |
| 1,856,226 | Rustin | May 3, 1932 |
| 2,365,105 | Perry | Dec. 12, 1944 |
| 2,383,099 | Wiehl | Aug. 21, 1945 |

FOREIGN PATENTS

| Number | Country | Date |
|---|---|---|
| 1,977 | Great Britain | May 6, 1912 |